MAGNETIC DOMAIN SHIFT REGISTER METER READER

Filed Dec. 6, 1966 5 Sheets-Sheet 1

INVENTORS P. I. BONYHARD
H. SEIDEL
H. M. SHAPIRO
BY Herbert M. Shapiro
ATTORNEY

March 24, 1970 P. I. BONYHARD ET AL 3,503,044

MAGNETIC DOMAIN SHIFT REGISTER METER READER

Filed Dec. 6, 1966 5 Sheets-Sheet 4

3,503,044
Patented Mar. 24, 1970

3,503,044

MAGNETIC DOMAIN SHIFT REGISTER METER READER

Peter I. Bonyhard, Newark, Harold Seidel, Fanwood, and Herbert M. Shapiro, Somerville, N.J., assignors to Bell Telephone Laboratories, Incorporated, Murray Hill and Berkeley Heights, N.J., a corporation of New York Filed Dec. 6, 1966, Ser. No. 599,487
Int. Cl. H04q *1/00*
U.S. Cl. 340—150 9 Claims

ABSTRACT OF THE DISCLOSURE

A multibit, magnetic domain shift register is applied to a face of a meter such that bit positions in the register conform to the digit positions on the meter face. A magnet attached to the meter indicator provides a domain at a position corresponding to the indicator position when interrogated. The domain is moved in the register in a manner to provide an indication of the meter reading.

This invention relates to devices for reading meters or registers and is particularly useful in applications where a visual indication of the meter reading is available at the site of the meter.

Meters are in widespread use. One common meter is the home gas flowmeter read monthly by the familiar meter man. The invention is described primarily in terms of such a flowmeter but will be seen to have more general application.

Many devices for reading flowmeters are known in the art. Most such devices, unfortunately, require (i.e., for sensing) additional dials and wheels which move physically, and accordingly are subject to all the limitations attending physical movement. Other such devices are complicated and require significant alternation of existing meters.

An object of the present invention is to provide a new and novel device for reading meters.

The foregoing and further objects of this invention are realized in one embodiment thereof wherein a domain wall wire shift register is utilized.

A domain wall shift register, for reference, is a device comprising a magnetic medium in which a reverse magnetized domain is nucleated in response to a first (nucleation) field in excess of a nucleation threshold and in which a reverse domain is moved in response to a second (propagation) field in excess of a propagation threshold but less than the nucleation threshold. Typically, the magnetic medium is "initialized" to a first magnetization direction and a first field is generated in a limited input portion for providing a reverse domain. A reverse domain is separated from adjacent initialized portions by what are termed leading and trailing domain walls. Second fields usually are generated in consecutive portions of the medium for advancing the domain to an output position. Such a device is described in K. D. Broadbent, Patent 2,919,432, issued Dec. 29, 1959. A magnetic wire suitable for such a device is described in copending application Ser. No. 458,140 for D. H. Smith and E. M. Tolman, filed May 24, 1965, now Patent 3,365,290.

The invention is based to some extent on the realization that a domain wall wire shift register may be contoured conveniently to follow the physical disposition of digit representations on existing meter faces and that each pointer indicating the present meter reading may be made to carry a small permanent magnet to provide, controllably, a reverse magnetized domain in a coded position in the domain wall wire. Illustratively, only a single domain wall of each domain so provided is advanced to a corresponding sense conductor. The sense conductors are arranged in series and positioned to detect the domain walls in order of least to most significant digit.

Accordingly, a feature of this invention is the contouring of a domain wall wire to follow the physical disposition of digit representations in a visual display.

Another feature of this invention is the controllable provision of reverse domains in a magnetic wire in coded positions corresponding to the pointer indications on an observable face of a meter.

The foregoing and further objects and features will be understood more fully from a consideration of the following detailed description rendered in conjunction with the accompanying drawing in which:

FIG. 1 is a schematic illustration of a remote meter reader in accordance with this invention;

FIGS. 2, 4, 5, and 6 are schematic representations of portions of the meter reader of FIG. 1 showing the magnetic conditions therein during operation;

Figures 1, 3:
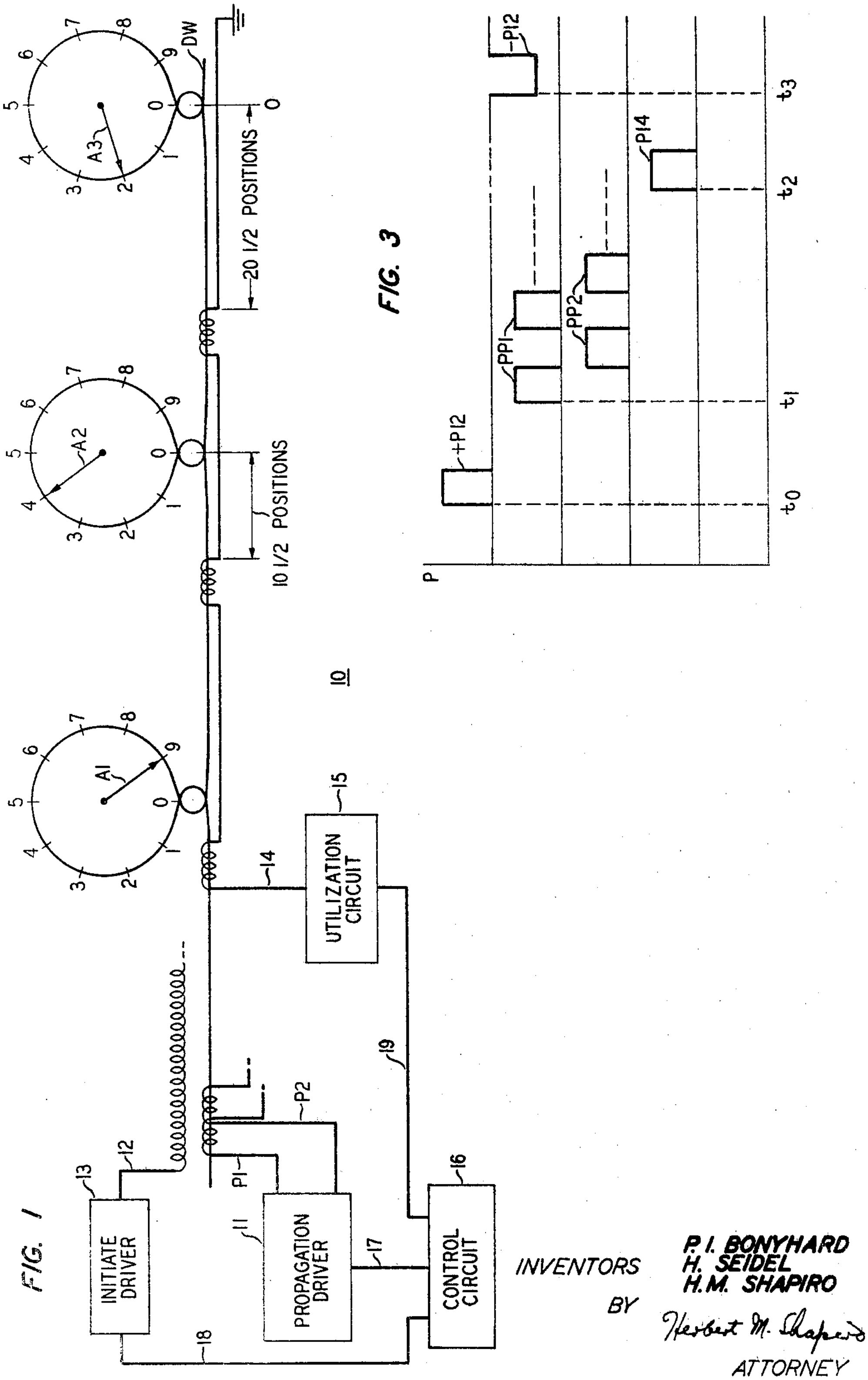
FIG. 3 is a pulse diagram of the operation of the meter reader of FIG. 1.

FIG. 1 shows a meter reader 10 in accordance with this invention. The meter reader comprises a magnetic domain wall wire DW contoured to follow the physical disposition of the digits displayed on the face (plate) of the meter. The dials are organized from least to most significant digit in series as shown illustratively from left to right in FIG. 1.

First and second propagation conductor P1 and P2 couple, in like sense, alternating positions along domain wall wire DW. Conductors P1 and P2 are connected between a propagation driver 11 and ground. The propagation conductors define bit locations along wire DW and are organized, as will become clear hereinafter, such that two "P1" coils along conductor P1 and two "P2" coils along conductor P2 couple wire DW between next adjacent digit representations on the face of the meter. The exact relative positions of those digits, for reasons which will also be made clear, correspond illustratively to the end of a P1 coil in a propagation conductor for the dial corresponding to the least significant digits and to the end of a P2 coil for each of the dials corresponding to the more and most significant digits, the positions being defined with respect to the next adjacent coil in the direction of the lower order digits in each dial as will become clear hereinafter.

Figure 2:
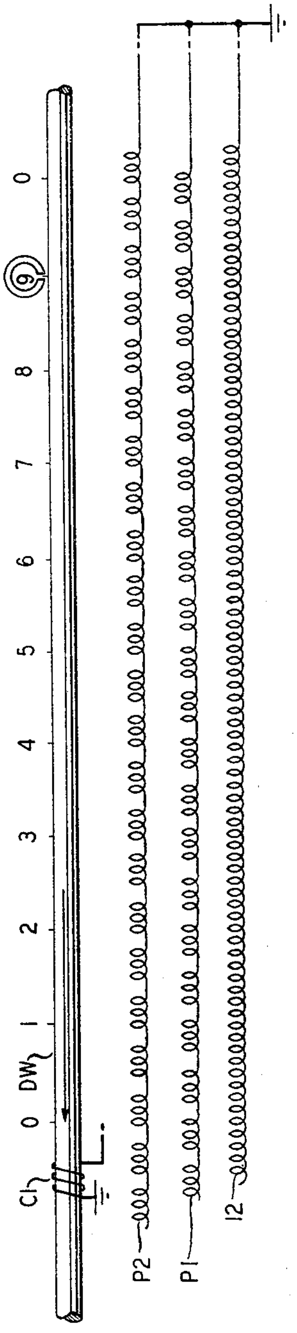

The propagation conductors P1 and P2 couple the entire length of wire DW except for portions therealong adjacent the highest digit for each set of digits (dial) shown in FIG. 1. The portions of wire DW uncoupled by conductors P1 and P2 are demarcated by vertical line pairs adjacent each 0(10) indication in FIG. 1. FIG. 2 shows the domain wall wire DW along a straight line. Conductors P1 and P2 are shown in FIG. 2 uncoupled to the portion of wire DW next adjacent the 0(10) position as indicated by the solid straight lines to the right of the coil indications. It is to be understood that domain walls do not move in the uncoupled portions of wire DW in response to drive pulses applied to conductors P1 and P2.

An "initiate" conductor 12 couples the entire length of wire DW and is connected between an initiate driver 13 and ground.

A sense conductor 14 is coupled, to wire DW in series, to positions coupled by a P1 coil one space apart from the digit 0, ten and one-half positions to the left of the digit 0, and twenty and one-half positions to the left of the digit 0, for the dials as viewed from left to right or, in other words, for the least to the most significant digit representations. Sense conductor 14 is connected between a utilization circuit 15 and ground.

Drivers 11 and 13 and utilization circuit 15 are connected to a control circuit 16 by means of conductors 17, 18, and 19, respectively. The various drivers and circuits may be any such elements capable of operating in accordance with this invention. A specific form for portions of the utilization and control circuits is discussed hereinafter with respect to the clarification of a possible ambiguity in the report of readings where the meters or registers provide continuous readings and are not organized to provide visual indications in discrete steps.

Let us neglect possible ambiguities in reported information for the moment and examine an illustrative operation of the meter reader of FIG. 1. We will assume that the pointers, designated A1, A2, and A3 in FIG. 1, common to flowmeters, include magnets which provide in wire DW a constricted field in excess of the propagation threshold and less than the nucleation threshold. We will assume also, for illustrative purposes, that pointers A1, A2, and A3 are pointing (approximately) to the 9, 4, and 2 digit representations in their respective dials as viewed from left to right in FIG. 1.

Operation is initiated by a positive initiate pulse +P12 applied to conductor 12 by means of initiate driver 13 under the control of control circuit 16. Such a pulse is represented in the pulse diagram of FIG. 3 at time $t_0$. Pulse +P12 causes a propagation field to be generated throughout wire DW. The magnets at points A1, A2, and A3 (each assumed illustratively to provide a field over a fraction of the length of a propagation coil) generate additional fields at corresponding positions in wire DW for exceeding the nucleation threshold there. Reverse magnetized domains are thus generated in the corresponding positions in wire DW.

A sequence of positive propagation pulses PP1 and PP2 is initiated at a time $t_1$. Such pulses are applied alternately to conductors P1 and P2 by means of propagation driver 11 under the control of control circuit 16. The pulses generate fields in coupled portions of wire DW for moving leading domain walls toward the positions corresponding to the lower order digits and for moving trailing domain walls toward the positions corresponding to the higher order digits in each dial.

We can be more specific about the movement of walls in response to the propagation pulses. FIG. 2 shows the portion of domain wall wire DW corresponding to the dial for the least significant digits disposed along a straight line for convenience. Initiate pulse +P12 and the field of pointer A1 together generate a reverse domain D in a position corresponding to the 9 representation. Domain D is shown as an arrow directed to the right in FIG. 4, the wire DW being assumed initialized to a magnetic condition represented by the arrow directed to the left in FIGS. 2 and 4. The domain D defines leading and trailing domain walls DL and D*t*, respectively, with the adjacent initialized portions. The fields associated with the propagation pulses PP1 and PP2 generate fields which move leading domain walls to the left as viewed in FIG. 4 and which move trailing walls to the right as viewed in FIG. 4 when such walls are present in the coupled portions of wire DW when conductors P1 and P2 are pulsed.

Figure 4:
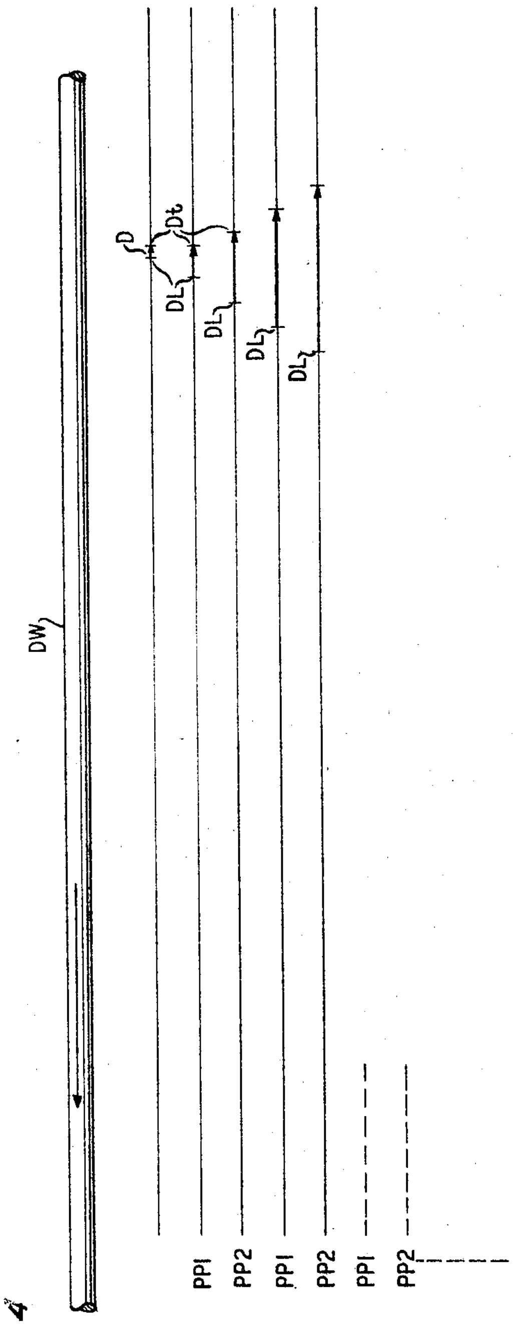

FIG. 4 shows the movement of leading and trailing domain walls DL and D*t* in response to the sequence of pulses PP1 and PP2. The first pulse PP1 does not affect the trailing domain wall because that wall is (assumed) in a position corresponding to a coil along the P2 conductor and thus is not moved by such a pulse. The leading domain wall, however, is advanced by a pulse PP1. This is clear from FIG. 4. The next pulse PP2 moves the leading and trailing domain walls to the left and to the right, respectively, to positions corresponding to the end of the correspondingly pulsed P2 coils. The next consecutive pulse PP1 similarly moves both walls. We need not keep track of the trailing wall from now on because it stops moving when it reaches the portion of wire DW uncoupled by conductors P1 and P2. The leading wall, however, advances, as may be seen, in response to each consecutive propagation pulse, requiring four such pulses to move the distance between one digit representation and the next. The propagation pulses are noted to the left of FIG. 4 in sequence from top to bottom in positions adjacent corresponding reverse domain indication.

Thirty-nine propagation pulses are provided, illustratively, to move leading wall DL to the position of the associated sense conductor coupling, designated C1 in FIG. 2, inducing a pulse P14 therein as indicated in FIG. 3 at time $t_2$. The sense conductor is conveniently positioned to correspond to a P1 coil spaced one P1 coil apart from the digit 0 position. Such a position adds three propagation pulses to the count over and above the number of pulses to advance a leading domain wall to the digit 0 position. It is clear that other positions for the sense conductor are possible so long as the count is adjusted accordingly.

Figure 5:
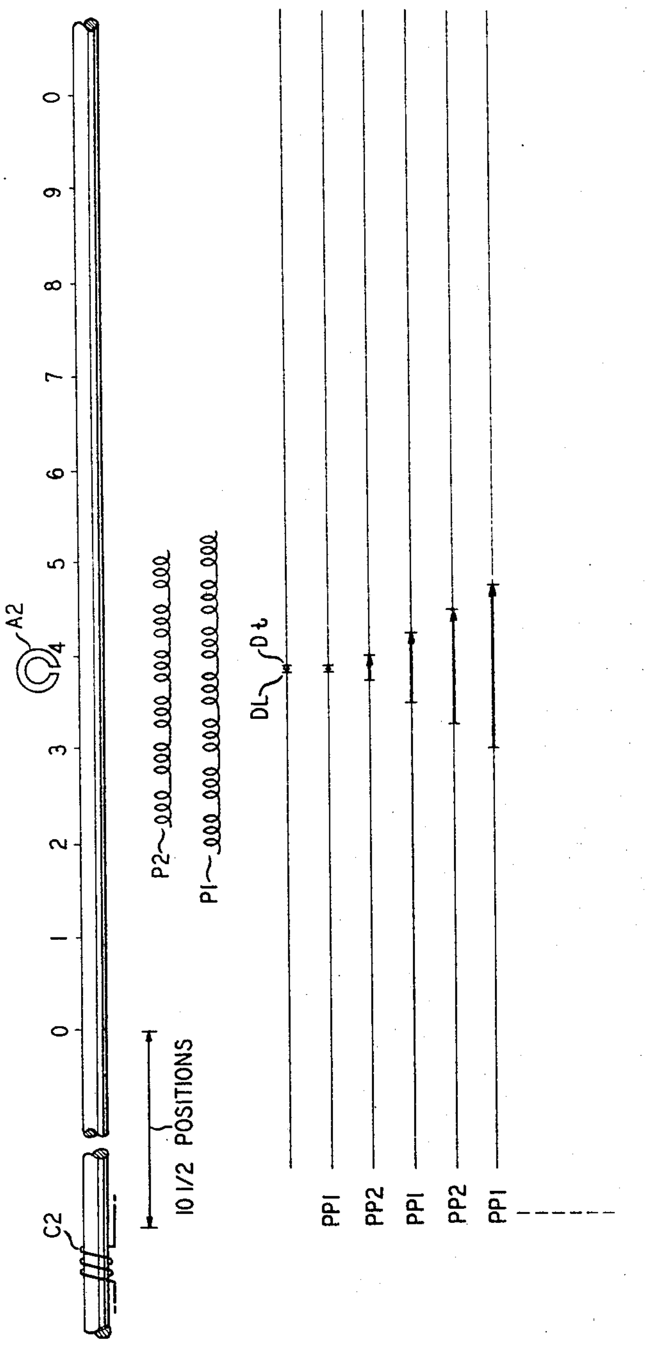

The sequence of propagation pulses also expands the main generated in wire D in an initial position corresponding to the indicator A2. The expansion of that domain is shown in FIG. 5. The leading wall DL is assumed, for illustrative purposes, in an initial position corresponding to a coupling between the P2 propagation conductor and the wire DW. The initial PP1 pulse does not move either the leading or trailing wall. The leading wall, then, requires five pulses to advance to the 3 position and four pulses for each position thereafter as is clear from FIG. 5. The thirty-nine pulses applied to advance the leading domain wall initially corresponding to the A1 indicator, thus, advance the leading domain wall initially corresponding to the A2 indicator twenty-two pulses beyond the digit 0 position. The corresponding sense conductor coupling, designated C2 in FIG. 5, is located ten and one-half positions (forty-two propagation pulses) beyond the digit 0 position, however. Consequently, twenty additional propagation pulses are required before the corresponding output pulse is generated in conductor 14.

Figure 6:
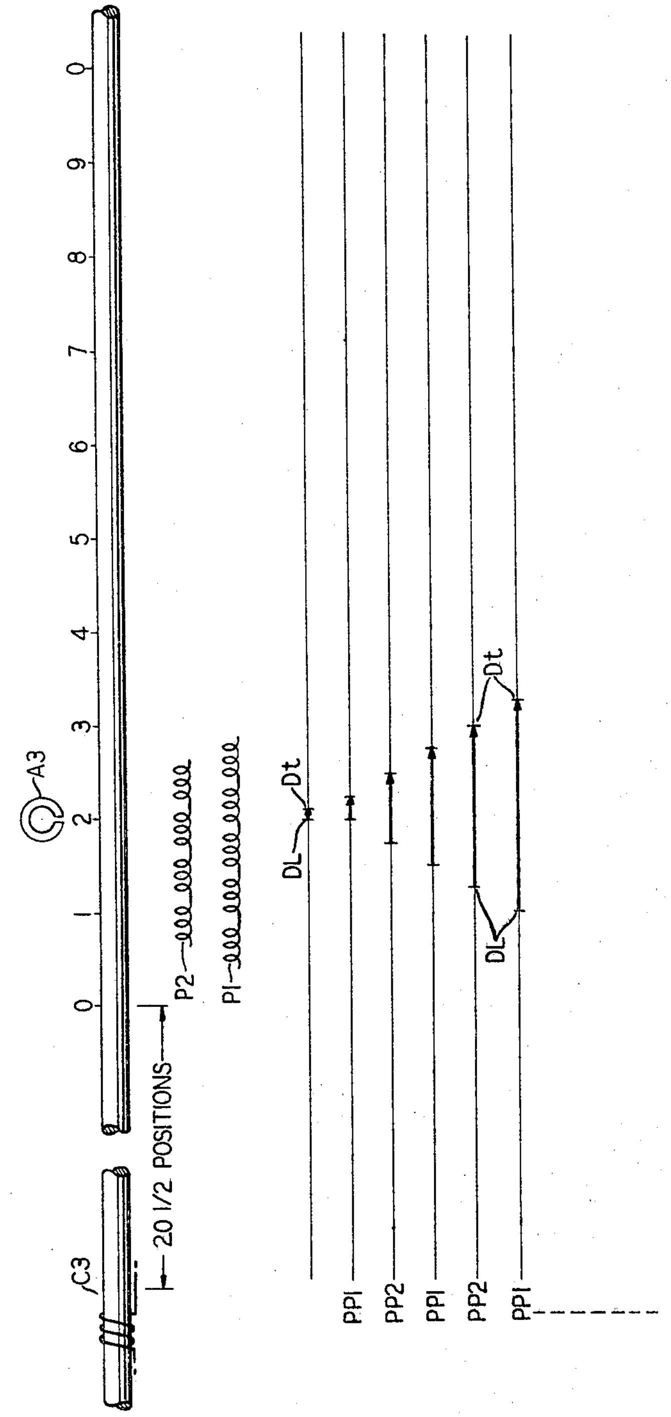

In a similar manner, ninety-one propagation pulses are required to provide a pulse in conductor 14 corresponding to the leading domain wall initially in the position of the A3 indicator. It is to be remembered that conductor 14 couples wire DW twenty and one-half positions (eighty-two propagation pulses) from the corresponding digit 0 position. This position for the coupling is indicated by coil C3 as shown in FIG. 6. The expansion of a domain for indicator A3 is also shown in FIG. 6. As depicted, five propagation pulses are required to move the leading domain wall the first position as was the case with indicator A2.

Table I shows the digit designated by an output pulse on conductor 14 of FIG. 1 when that output pulse accompanies the propagation pulse shown in corresponding rows of the table. It is to be remembered that the sense coils couple wire DW, illustratively, at positions coupled by a P1 coil. Consequently, outputs appear in sense conductor 14 only during alternate propagation pulses, that is to say, only during PP1 pulses. It may be observed that of the two consecutive PP1 pulses corresponding to a particular digit position, one corresponds to the whole count (i.e., 8) and the other corresponds to the half count (i.e., 8½).

We will have occasion to refer to the whole and half-count notation hereinafter.

TABLE I

| Digit represented | Propagation pulse # for A1 | Propagation pulse # for A2 | Propagation pulse # for A3 |
|---|---|---|---|
| 9 | 1 | | |
| 0 | 3 or 5 | 43 or 45 | 83 or 85 |
| 1 | 7 or 9 | 47 or 49 | 87 or 89 |
| 2 | 11 or 13 | 51 or 53 | 91 or 93 |
| 3 | 15 or 17 | 55 or 57 | 95 or 97 |
| 4 | 19 or 21 | 59 or 61 | 99 or 101 |
| 5 | 23 or 25 | 63 or 65 | 103 or 105 |
| 6 | 27 or 29 | 67 or 69 | 107 or 109 |
| 7 | 31 or 33 | 71 or 73 | 111 or 113 |
| 8 | 35 or 37 | 75 or 77 | 115 or 117 |
| 9 | 39 or 41 | 79 or 81 | 119 or 121 |

The indicators A1, A2, and A3 were shown initially directed (approximately) at the 9, 4, and 2 digit indications in the respective dials. Coded output pulses corresponding to such indications are provided in conductor 14, illustratively, during the thirty-ninth, fifty-ninth, and ninety-first propagation pulses for detection by utilization circuit 15 under the control of control circuit 16.

Operation is terminated under the control of control circuit 16 upon the provision of the one-hundred twenty-second propagation pulse thus providing a sufficient number of propagation pulses to insure receipt of any three digit indications as described.

The foregoing is a description of an illustrative initial operaton of the meter reader of FIG. 1. Once the meter has been used, a reverse domain is permanently present at each dial. Succeeding interrogation of the meter then is preceded by a negative pulse −P12 on conductor 12 shown at time $t_3$ in FIG. 3. Such a pulse returns associated domain walls to the positions of the indicator at each dial readying the circuit for an additional operation as already described. Even if reverse domains on the wire are annihilated, however, they are provided again by the next subsequent pulse +P12 exactly as already described.

A glance at FIGS. 4, 5, and 6 indicates that the initial positions for the reverse magnetized domains have been chosen to be in different physical positions with respect to the propagation coils as, of course, will almost always be the case when flowmeters are read in accordance with this invention. It is clear from the illustrative operation that such differences in initial positions are of no consequence because the propagaton pulses synchronize the movement of domains. Any output pulse appearing during one of the two PP1 pulses corresponding to the spacing between two consecutive digits is taken to correspond to the lower of the two digits. (Accuracy is increased by increasing the number of couplings between the propagation conductors and wire DW.)

When a meter points somewhere near an integer along a dial, the reading is ambiguous. For example, a 3.000 should be read as a 3 whereas 2.999 should be read as a 2. A meter man compensates for such an ambiguity by looking at the value of the next less significant digit. We do the same thing here. If the next less significant digit is a high number 8 or 9 for example, we know the ambiguous digit should be a 2. On the other hand, if the next less significant digit is a low number, for example 0, 1, or 2, the ambiguous digit should be a 3. The ambiguity is resolved merely by, in essence, shifting the position of a domain wall corresponding to the ambiguous digit one count to the right as viewed in FIG. 2 if a 0–1–2– is detected as the next less significant digit, and by shifting the wall one count to the left if a 6, 7, 8, or 9 is detected as the next less significant digit. Rather than actually shifting the position of a domain wall, the utilization circuit may be arranged to modify the count to this end.

Figure 7:
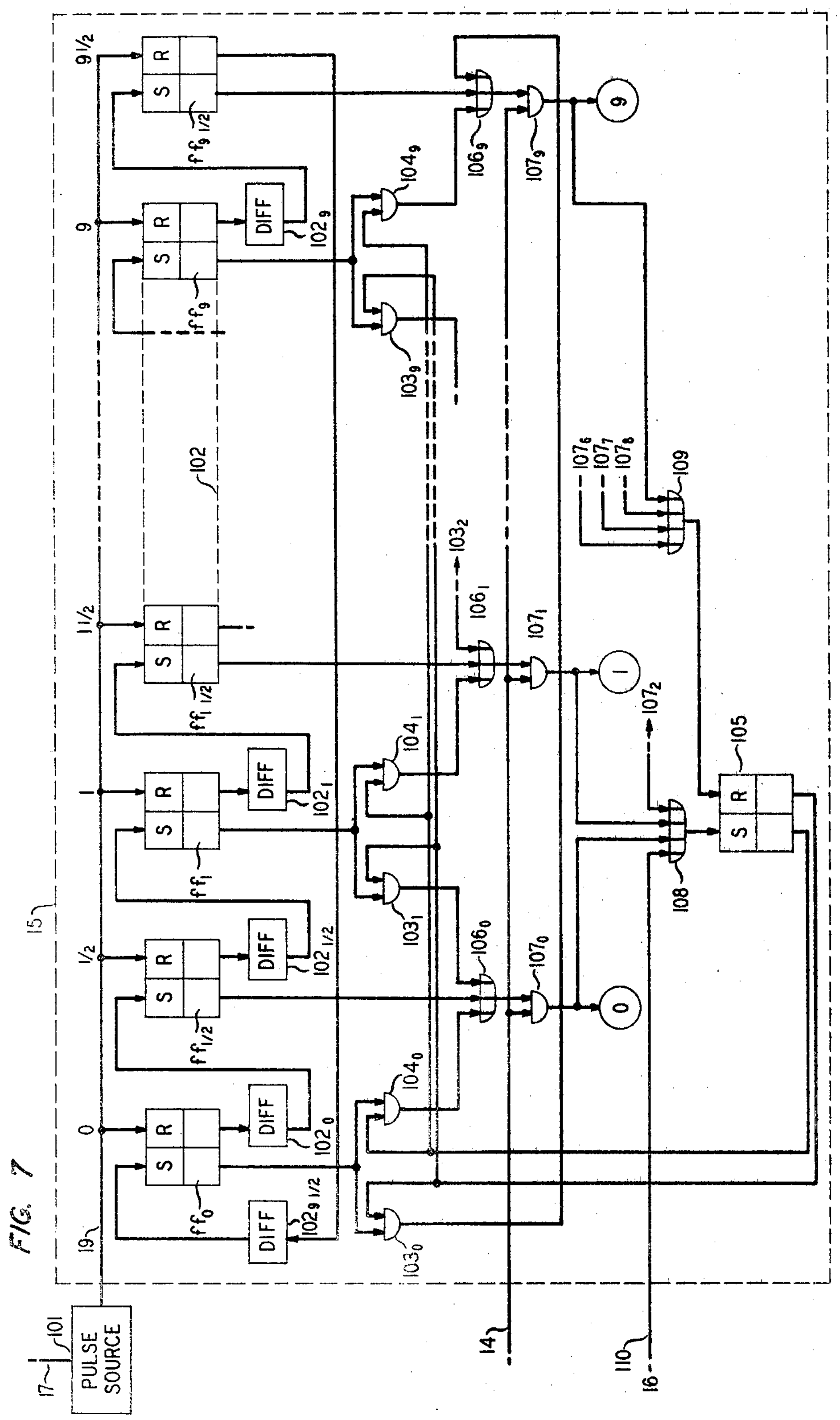
FIG. 7 is a schematic representation of portions of the control and utilization circuits for the meter reader of FIG. 1.

FIG. 7 shows, in detail, portions of control circuit 16 and utilization circuit 15 which convert coded output pulses into readings and resolves the ambiguity problem. Specifically, control circuit 16 (of FIG. 1) includes a pulse source 101 synchronized with propagation driver 11 of FIG. 1 to which it is connected by means of conductor 17 as indicated in FIG. 7.

Utilization circuit 15 incudes a (recirculating) counter 102 the stages of which are designated by the propagation pulse, in whole and half-count notation, to which each stage corresponds. Each stage of counter 102 includes a flip-flop, designated $ff_i$ where $i$ corresponds to the stage notation. The output of pulse source 101 of control circuit 16 is connected to the reset input of each flip-flop in counter 102 by means of conductor 19 as shown in FIG. 7 (also see FIG. 1).

The flip-flop of each whole and half-count stage of counter 102 includes a reset output as shown in FIG. 7. The reset output of each flip-flop is connected to the set input of the flip-flop of the next consecutive stage via differentiators $\mathbf{102}_i$ where the $i$ again designates the corresponding stage designation as shown in FIG. 7. The set outputs of flip-flops $ff_i$ corresponding to the whole number stages are connected to inputs of associated AND circuits $\mathbf{103}_i$ and $\mathbf{104}_i$. The other input of each AND circuit $\mathbf{103}_i$ is connected to the reset output of a flip-flop 105. The other input of each AND circuit $\mathbf{104}_i$ is connected to the set output of flip-flop 105. The outputs of AND circuits 104, and the outputs of AND circuit $\mathbf{103}_{i+1}$ associated with next adjacent whole number stages of counter 102 are connected to inputs of corresponding OR circuits $\mathbf{106}_i$ where the $i$ corresponds to the associated lower order whole number stage of the counter.

The outputs of the stages of counter 102 corresponding to half numbers between $i$ and $i+1$ are connected also to inputs of corresponding OR circuits $\mathbf{106}_i$.

The output of each OR circuit $\mathbf{106}_i$ is connected to the input of a corresponding AND circuit $\mathbf{107}_i$. Sense conductor 14 of FIG. 1 is connected to a second input of each of AND circuits $\mathbf{107}_i$. The outputs of AND circuits $\mathbf{107}_i$ are connected to corresponding indicator stages represented by encirclued numbers. Such indicator stages may comprise, for example, any conventional printout device or punch card device controllable in this fashion.

The outputs of AND circuits $\mathbf{107}_0$, $\mathbf{107}_1$, and $\mathbf{107}_2$ and the outputs of AND circuits $\mathbf{107}_6$, $\mathbf{107}_7$, $\mathbf{107}_8$, and $\mathbf{107}_9$ are connected to inputs of OR circuits 108 and 109, respectively. The outputs of OR circuits 108 and 109 are connected to the set and reset inputs of flip-flop 105, respectively. The reset and set outputs of flip-flop 105 are, in turn, connected to an input of each of AND circuits $\mathbf{103}_i$ and to inputs of each of AND circuits $\mathbf{104}_i$, respectively, as has been described above.

Flip-flop 105 provides an output level in either of its set or reset states. A differentiator $\mathbf{102}_i$ provides a pulse when the corresponding counter stage switches from a set to a reset condition.

Pulse source 101 provides a pulse on conductor 19 for each propagation pulse PP2 provided by propagation driver 11 in FIG. 1. Each pulse PP2 resets all the counter stages, the active stage in each instance acting, via the corresponding differentiator, to set the next consecutive stage. Thus, counter 102 advances one stage each time a PP2 pulse is provided. The active set stage of counter 102 provides a static output, i.e., high voltage output, between propagation pulses PP2. Sense conductor 14 of FIG. 1 is coupled to wire DW at a P1 coupling as shown in FIG. 2. Consequently, an output pulse on conductor 14 of FIG. 1 is provided during a propagation pulse PP1 enabling all AND circuits $\mathbf{107}_i$. While such an output pulse occurs, the set counter stage, then, provides an output also. The counter is set either to a whole-count stage or to a half-count stage when an output occurs in conductor 14. In response to the counter output, the corresponding AND circuit $\mathbf{103}_i$, or $\mathbf{104}_i$, is activated if the set stage corresponds to a whole number. And, in turn, the corresponding OR circuit $\mathbf{106}_i$ is activated activating the corresponding AND circuit $\mathbf{107}_i$ for providing a reading. Alternatively, the corresponding OR circuit $106_1$ is activated (directly) if the set stage corresponds to a one-half count.

The latter case causes no problems. However, consider the case where the set stage corresponds to a whole number. It is clear that ambiguities may occur only when the counter is set to a whole number stage. Specifically, consider the case where the least significant digit is 9. When the reading of the meter reader of FIG. 1 is initiated, a negative pulse is applied to conductor 12 of FIG. 1 to move the domain walls (tend to collapse the domains) to the positions of the indicators. Such a pulse also provides or, alternatively, is accompanied by a pulse for setting flip-flop 105 under the control of control circuit 16 as indicated by the line 110 connected to an input of OR circuit 108 as shown in FIG. 7. In any case, OR circuit 108 is activated and flip-flop 105 is set, in turn, enabling all AND circuits $104_i$.

Following the initiating pulse on conductor 12, counter 102 steps through its stages, as described, activating enabled AND circuit $104_9$, OR circuit $106_9$, and AND circuit $107_9$ providing a 9 indication. The output of AND circuit $107_9$ resets flip-flop 105 via OR circuit 109.

The next digit indication (pulse on conductor 14) should be a 1 for example but appears during a propagation pulse corresponding to a 2. Flip-flop 105 is in a reset condition and thus all AND circuits $103_i$ are enabled. AND circuit $103_2$ (not shown) is thus activated. In turn, OR circuit $106_1$ is activated in turn enabling AND circuit $107_1$. The pulse on conductor 14 thus is gated to provide a 1 indication. It is clear that the circuit of FIG. 7 corrects for ambiguities occurring when next less significant numbers are high.

The circuit of FIG. 7 operates in a similar manner to correct for ambiguities when a next less significant number is low. For example, if a least significant digit indication is a 1, flip-flop $ff_1$ is set. AND circuits $104_i$ are enabled initially. Accordingly, AND circuit $104_1$ is activated activating OR circuit $106_1$ and enabling AND circuit $107_1$. An output pulse on conductor 14 activates AND circuit $107_1$ providing a 1 indication and setting flip-flop 105. AND circuits $104_i$ are again enabled. The next more significant digit indication should, for example, be a 2 and the output pulse appears on conductor 14 when counter 102 is set to the 2 stage. In such a case, AND circuit $104_2$ (not shown) is activated and AND circuit $107_2$ is enabled. Thus, the pulse on conductor 14 is gated to provide a 2 indication.

An ambiguity in the reading of a whole number indication is resolved, then, by reading the number as the higher of the two possible readings or the lower of the two possible readings depending on whether the next less significant digit is low or high, respectively. The indications 942 as shown in FIG. 1 are read correctly as 932 in this manner.

As has been stated before, operation ceases after one hundred twenty-two PP1 pulses. The counter 102, consequently, is set to the 9½ stage to which it is conveniently set initially by means not shown. When operation is initiated, then, the first PP2 pulse sets the counter to the 0 stage.

Illustratively, the field provided by an indicator is confined to an area less than the length of one propagation coil. An air gap in a ring magnet as shown in FIGS. 4, 5 and 6 as the indicators A1, A2, and A3 may be made suitable small to this end. The field provided by an indicator may extend up to the length of two propagation coils, however.

A comparison of FIGS. 4, 5 and 6 indicates that the digit notations in FIG. 4 correspond to the end of a P1 propagation coil and that the digit notations in FIGS. 5 and 6 correspond to the end of P2 coils. Such an "offset" position is convenient for least significant digit indications to permit rounding off to the next lower order whole number as is clear from the discussion of FIGS. 4, 5, and 6. Such a rounding off is unnecessary for all but the least significant digit. The indicator A1 may be offset a compensating one-fourth position from the field generating portion of the associated magnet. It is convenient for wire DW to cross itself at the 9½ position for the least significant digit representations rather than at the 0 position shown (FIG. 1) also for rounding off purposes.

It has been found that presently available magnetic wire may be bent into a three-eighth inch curve without altering the characteristics of the wire. The configuration of the magnetic wire DW at the (9½ or) 0 position on each dial indication in FIG. 1 takes such a curvature into account. Cross coupling between the wires at the 0 point is avoided in any suitable conventional manner.

In registers of a type such that a reverse domain is provided, selectively, at specific (discrete) positions on a magnetic wire, the ambiguity problem does not occur. Such a register might be a pushbutton dial where magnets are associated with buttons in fixed position. The depression of a pushbutton displaces a magnet to a position in proximity with a corresponding position along the wire for establishing the domain and initiates a propagation sequence.

Contoured magnetic wires as described permit translation in the absence of contacts between input circuitry and indication shifting circuitry. Alternatively, other shifting circuitry may be employed in accordance with this invention so long as a one-to-one correspondence between input and digit positions is maintained.

The invention has been described in terms of providing coded indications of dial indicator positions. In another aspect of this invention it is contemplated to provide coded indications for setting dial indicators. The disclosed arrangement may be adapted to this end by providing coded discontinuities in the shift register channel and arranging the indicators to "lock up" on such discontinuities. Operation in accordance with this aspect of the invention is to be recognized as the opposite of the operation described and may be used to set controls at a remote position.

What has been described is considered only illustrative of the principles of this invention. Accordingly, other and different arrangements according to those principles may be devised by one skilled in the art without departing from the spirit and scope of this invention.

What is claimed is:

1. A combination comprising means for defining a geometric arrangement of digit positions, an indicator selectively movable to said digit positions, a propagation channel having bit positions corrssponding to said digit positions for storing indications therein, means for providing directly in said channel indications corresponding to the digit position indicated, and means for synchronously advancing said indications in said channel.

2. A combination comprising means for defining a geometric arrangement of digit positions, indicators selectively movable to said digit positions, a magnetic propagation channel having bit positions corresponding to said digit positions, means responsive to a first signal for providing directly in said channel magnetic indications corresponding to the digit positions indicated, and means for synchronously advancing magnetic indications in said channel.

3. A combination in accordance with claim 2 wherein said magnetic channel is a domain wall wire and said magnetic indications are reverse magnetized domains having leading domain walls.

4. A combination in accordance with claim 3 including sense means coupled to an output position in said wire for indicating the passage of leading domain walls.

5. A combination in accordance with claim 3 wherein said means defining a geometric arrangement comprises a plurality of dials having like sequences of digit positions, and wherein said magnetic wire is disposed to conform to the digit positions of the several dials in series.

6. A combination in accordance with claim 5 wherein said dials are organized in order from most to least significant digit, including a sense conductor coupled to said wire at each of said dials for indicating the passage of leading domain walls there.

7. A combination in accordance with claim 6 including dials corresponding to least, more, and most significant digits wherein said sense conductor couples said wire at a first position at the dial corresponding to the least significant digit, at a position ten and one-half positions removed from a corresponding position at the dial corresponding to the more significant digit, and at a position twenty and one-half positions removed from a corresponding position at the dial corresponding to the most significant digit.

8. A combination in accordance with claim 7 including means responsive to an indication of a low number on the dial corresponding to a digit of first significance for recording the higher of two possible readings on the dial corresponding to a digit of second significance higher than said first.

9. A combination in accordance with claim 8 including means responsive to an indication of a high number on the dial corresponding to a digit of a first significance for recording the lower of two possible readings on the dial corresponding to a digit of second significance higher than said first.

References Cited

UNITED STATES PATENTS

| | | | |
|---|---|---|---|
| 3,170,150 | 2/1965 | Kelar et al. | 340—197 |
| 3,295,114 | 12/1966 | Snyder. | |
| 3,334,343 | 8/1967 | Snyder. | |

DONALD J. YUSKO, Primary Examiner